(12) United States Patent
Yano

(10) Patent No.: US 9,728,859 B2
(45) Date of Patent: Aug. 8, 2017

(54) ANTENNA AND METHOD OF MANUFACTURING THE ANTENNA

(71) Applicant: Furuno Electric Co., Ltd., Nishinomiya (JP)

(72) Inventor: Kohji Yano, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 394 days.

(21) Appl. No.: 14/390,370

(22) PCT Filed: Apr. 1, 2013

(86) PCT No.: PCT/JP2013/059844
§ 371 (c)(1),
(2) Date: Oct. 2, 2014

(87) PCT Pub. No.: WO2013/150995
PCT Pub. Date: Oct. 10, 2013

(65) Prior Publication Data
US 2015/0029055 A1    Jan. 29, 2015

(30) Foreign Application Priority Data
Apr. 2, 2012  (JP) ................ 2012-084034

(51) Int. Cl.
*G01S 13/95*  (2006.01)
*H01Q 13/18*  (2006.01)
(Continued)

(52) U.S. Cl.
CPC ............. *H01Q 13/18* (2013.01); *G01S 13/95* (2013.01); *H01Q 13/22* (2013.01);
(Continued)

(58) Field of Classification Search
CPC ........ G01S 13/95; H01Q 13/18; H01Q 13/22; H01Q 21/005; H01Q 21/064
(Continued)

(56) References Cited

U.S. PATENT DOCUMENTS 3,369,244 A    2/1968  Masters
3,599,216 A    8/1971  Seaton
(Continued)

FOREIGN PATENT DOCUMENTS

JP    H1188043 A    3/1999
JP    2005073121 A    3/2005
(Continued)

OTHER PUBLICATIONS

European Patent Office, Extended European Search Report Issued in Application No. 13772217.9, Oct. 30, 2015, Germany, 7 pages.
(Continued)

*Primary Examiner* — Timothy A Brainard
(74) *Attorney, Agent, or Firm* — Alleman Hall Creasman & Tuttle LLP

(57) ABSTRACT

A slot array antenna where slots are arrayed in two directions is provided for suppressing occurrence of side lobes. An antenna includes a radiation waveguide part and stubs. The radiation waveguide part has two sheets of metal plates facing each other and outwardly radiates a radio wave from a plurality of slots formed in one of the metal plates. Each stub is arranged for every slot to extend inward of the radiation waveguide part from the face where the slots are formed, and changes a transmission mode of the radio wave within the radiation waveguide part. The slots are narrow and arranged at fixed intervals in both a longitudinal direction and a lateral direction of the slots. The stub is disposed for every slot, on either side of the slot in the lateral
(Continued)

direction. Between the adjacent slots, the stubs are disposed on the opposite sides in the lateral direction.

12 Claims, 6 Drawing Sheets

(51) Int. Cl.
   *H01Q 13/22* (2006.01)
   *H01Q 21/00* (2006.01)
   *H01Q 21/06* (2006.01)

(52) U.S. Cl.
   CPC ......... *H01Q 21/005* (2013.01); *H01Q 21/064* (2013.01); *Y10T 29/49016* (2015.01)

(58) Field of Classification Search
   USPC ....................................... 342/26 R
   See application file for complete search history.

(56) References Cited

U.S. PATENT DOCUMENTS

| | | |
|---|---|---|
| 3,716,868 A | 2/1973 | McComas et al. |
| 5,289,200 A | 2/1994 | Kelly |
| 2006/0132374 A1* | 6/2006 | Wang ................... H01Q 1/3275 343/770 |

FOREIGN PATENT DOCUMENTS

| | | |
|---|---|---|
| JP | 201056985 A | 3/2010 |
| JP | 2010103806 A | 5/2010 |
| JP | 201219258 A | 1/2012 |

OTHER PUBLICATIONS

ISA Japanese Patent Office, International Search Report of PCT/JP2013/059844, Jun. 25, 2013, 2 pages.

* cited by examiner

FIG. 6(A)
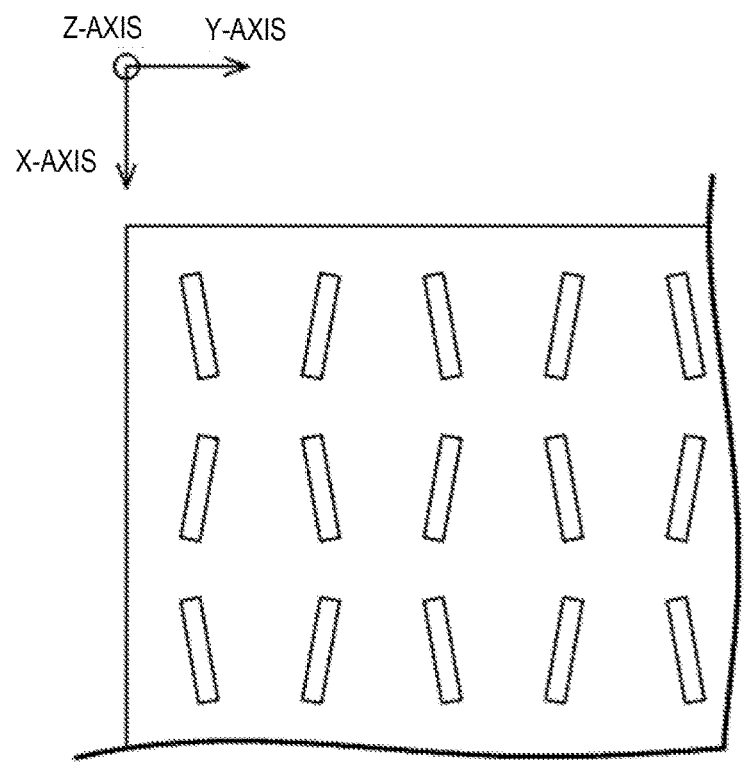
FIG. 6(B)
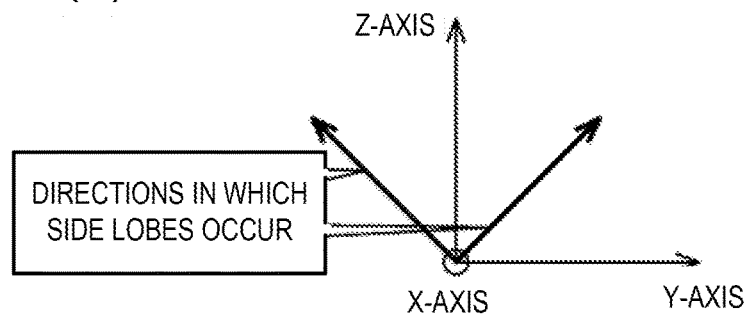
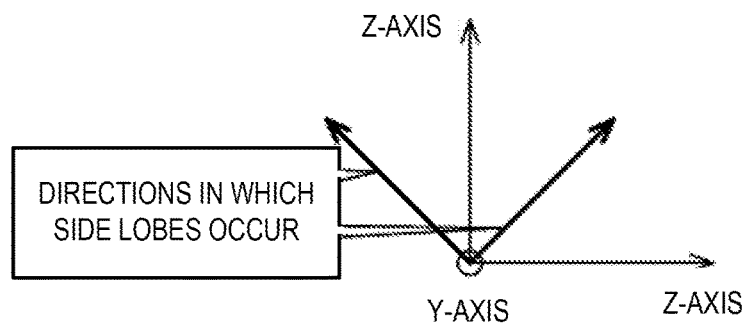

ANTENNA AND METHOD OF MANUFACTURING THE ANTENNA

TECHNICAL FIELD

This disclosure relates to a slot array antenna where slots are arrayed in two directions.

BACKGROUND ART

Conventionally, antennas having a configuration in which two sheets of conductive plates having conductivity are disposed at a predetermined distance from each other, and slots are formed in one of the conductive plates have been known. With this configuration, radio waves propagated between the two sheets of conductive plates are radiated outside from the slots. Patent Document 1 discloses an antenna similar to such kind of antennas.

Patent Document 1 discloses a microstrip antenna having a configuration formed with a plurality of probes formed to pass through the center of the conductive plates. In Patent Document 1, an effect that a radiating direction of a beam can be substantially matched with normal directions of the conductive plates, an effect that a frequency property of the antenna improves, and the like by forming the probes as above, are disclosed.

Patent Document 2 discloses a slot array antenna where slots are arrayed in one direction. In Patent Document 2, a probe is disposed inside a coaxial waveguide converter. By disposing the probe as above, a mode of an electromagnetic wave to be transmitted can be switched.

REFERENCE DOCUMENTS OF CONVENTIONAL ART

Patent Document(s)

Patent Document 1: JPH11-088043A
Patent Document 2: JP2005-073212A

DISCLOSURE OF THE INVENTION

Problems to be Solved by the Invention

Meanwhile, the microstrip antenna of Patent Document 1 can suppress occurrence of a side lobe to some extent by disposing the probes as described above.

Whereas, with slot array antennas, if slots are arranged parallel at a fixed interval of the slots, radio waves interfere, cancel each other out, and will not be radiated. Therefore, conventionally, by forming inclined slots (FIG. 6(A)) or differentiating the interval at which the slots are formed, the radio waves are radiated.

However, for such a slot array antenna, since the slots are not arranged symmetrically, it is known that side lobes are produced in the directions illustrated in FIG. 6(B).

This disclosure is made in view of the above situations and aims to provide a slot array antenna where slots are arrayed in two directions, which has a configuration capable of suppressing occurrence of side lobes and suppressed in weight.

SUMMARY AND EFFECT(S) OF THE INVENTION

Problems to be solved by the present disclosure are described above, and means for solving the problems and effects thereof will be described below.

According to a first aspect of this disclosure, an antenna with the following configuration is provided. That is, the antenna includes a radiation waveguide part and stubs. The radiation waveguide part includes two sheets of metal plates facing each other and outwardly radiates a radio wave from a plurality of slots formed in one of the metal plates. Each stub is arranged for every slot to extend inward of the radiation waveguide part from a face of the radiation waveguide part where the slots are formed, and changes a transmission mode of the radio wave within the radiation waveguide part. The slots are narrow and arranged at fixed intervals in a longitudinal direction of the slots and in a lateral direction of the slots, respectively. The stub is disposed for every slot, on either one of sides of the slot in the lateral direction, the adjacent stubs in the lateral direction being disposed on the opposite sides.

Thereby, the radio waves can be prevented from cancelling each other out while the slots are arrayed symmetrically, and thus, occurrence of unnecessary lobes can be suppressed. Further, since the radiation waveguide part is made of the metal plates, the radiation waveguide part can be reduced in weight and the attaching of the stub becomes easy. Further, since the stubs are attached to the face where the slots are formed, the number of the metal plates that require processing can be one, and as a result, the manufacturing process of the antenna can be simple. Furthermore, since the antenna is made of metal plates, the weight can be reduced considerably compared with antennas formed with the conventional manufacturing methods such as casting, etc.

In the antenna, the stub preferably has a circular cylindrical shape, and the stub is preferably press-fitted into the radiation waveguide part mechanically.

Thereby, the stubs can be attached easily and accurately by forming the stub into the circular cylindrical shape suitable for press-fitting and by using, for example, a press fitting machine to mechanically press-fit the stub. Specifically, since the radiation waveguide part of this disclosure is made of the metal plates, it can be processed promptly.

The antenna is preferably configured as follows. That is, the radiation waveguide part is formed by the front-face metal plate forming at least a front face of the radiation waveguide part and the back-face metal plate forming at least a back face of the radiation waveguide part. At least one of the front-face metal plate and the back-face metal plate is bent, and by utilizing the bent portion, the front-face metal plate is connected with the back-face metal plate.

Thereby, for example, plate members connecting the two sheets of metal plates become unnecessary. Further, since metal plates are easy to be bent (stamped), the costs of processing and assembling can be reduced.

In the antenna, an interval between the slot and the stub is preferably different depending on the position of the stub on the radiation waveguide part.

Thereby, the intensity of the radio wave to be radiated can be adjusted.

The antenna is preferably used for meteorological observation.

Thereby, the effects of this disclosure can be exerted with an antenna for meteorological observation. Especially, in this disclosure, since the radiation waveguide part is made of metal plates as described above, the weight is reduced. Therefore, the workability can be improved when arranging a plurality of radars collectively.

According to a second aspect of this disclosure, a method of manufacturing an antenna described as follows is provided. That is, the method of manufacturing the antenna includes forming slots in a front-face metal plate configured to form a front face of a radiation waveguide part such that the slots are arranged at fixed intervals in a longitudinal direction of the slots and in a lateral direction of the slots, respectively. The method includes piling a stub from a back side of the front-face metal plate for every slot, on either one of sides of the slot in the lateral direction. The method includes connecting the front-face metal plate with a back-face metal plate configured to form a back face of the radiation waveguide part.

The antenna manufactured by the method described above can prevent occurrence of unnecessary lobes. Further, since the stub is piled from the back side of the front-face metal plate, burrs are positioned on an outer side (front face) of the radiation waveguide part. Therefore, it is unnecessary to remove the burrs accurately, and thus, the antenna can be manufactured effectively.

BRIEF DESCRIPTION OF DRAWINGS

FIGS. 6(A) and 6(B) show views illustrating an arrangement of slots of a conventional antenna and a direction of side lobes that occurs with the antenna.

MODE(S) FOR CARRYING OUT THE INVENTION

Figure 1:
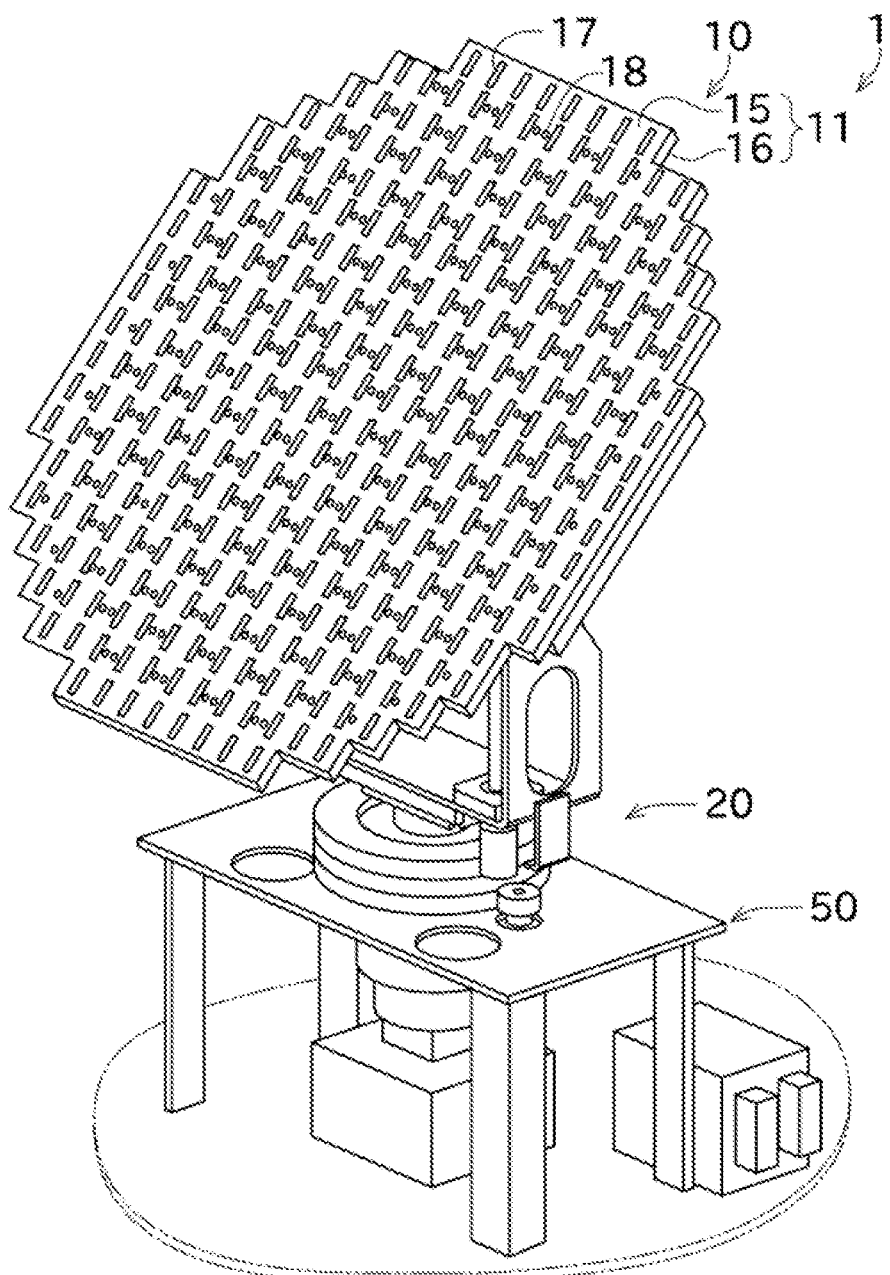
FIG. 1 is a perspective view of an antenna device according one embodiment of this disclosure.
Figure 2:
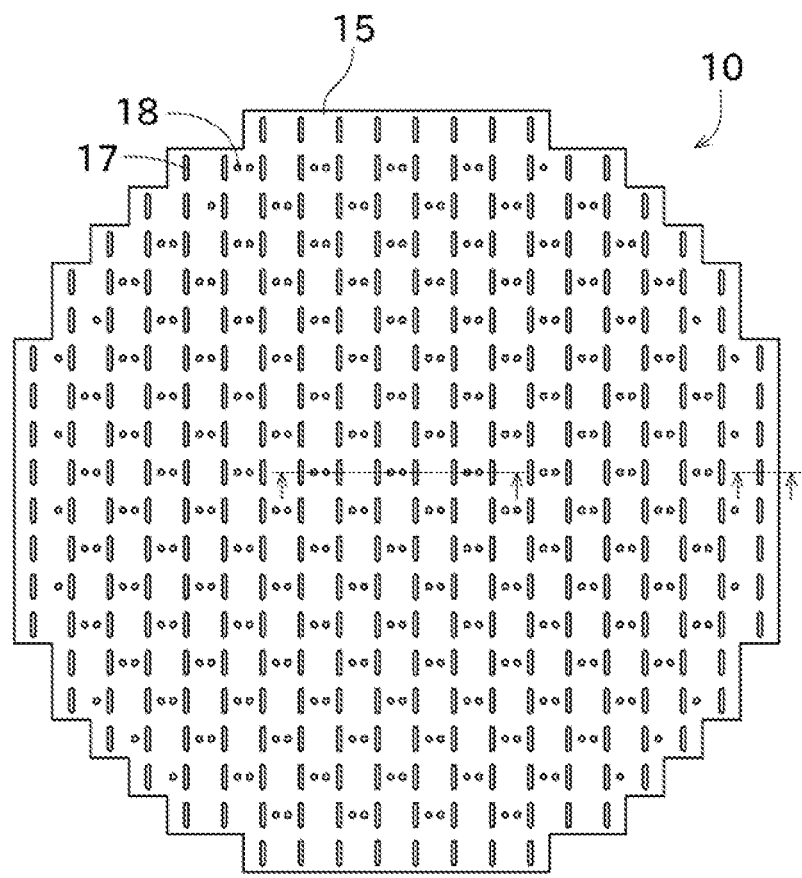
FIG. 2 is a planar view of an antenna.

Next, an embodiment of this disclosure is described with reference to the drawings. FIG. 1 is a perspective view of an antenna device 1 according one embodiment of this disclosure. FIG. 2 is a planar view of an antenna 10.

The antenna device 1 configures a radar apparatus along with a non-illustrated radio wave generator (e.g., a magnetron), a controller and the like. The antenna device 1 is used, for example, for meteorological observation; however, it can also be used for other applications (e.g., communication).

As illustrated in FIG. 1, the antenna device 1 includes the antenna 10, a transmission part 20, and a pedestal 50. The antenna 10 is configured to be rotatable in vertical directions (directions of changing an elevation angle) and horizontal directions (directions of changing an azimuth).

The pedestal 50 has legs and a supporting plate fixed to the legs. Respective components (e.g., a gear and a waveguide) configuring the transmission part 20 are attached to this supporting plate. Further, a motor (not illustrated) configured to rotate the antenna 10 in the vertical directions and a motor (not illustrated) configured to rotate the antenna 10 in the horizontal directions are attached to this pedestal 50.

The transmission part 20 can rotate the antenna 10 in the vertical and horizontal directions by using gears and the like to transmit powers of these motors. Moreover, the transmission part 20 includes a non-illustrated waveguide configured to transmit, to the antenna 10, a radio wave (electromagnetic wave) generated by the radio wave generator.

The antenna 10 includes a radiation waveguide part 11 and stubs 18. This radiation waveguide part 11 has a front-face metal plate 15 and a back-face metal plate 16.

The front-face metal plate 15 is a member forming a front face (radio wave reflection face) of the radiation waveguide part 11. Slots 17 are formed and stubs 18 are disposed in the front surface of this front-face metal plate 15. The slots 17 and the stubs 18 are described later in detail.

The back-face metal plate 16 is a member forming a back face (opposite face to the radio reflection face) of the radiation waveguide part 11. In this back-face metal plate 16, non-illustrated opening(s) are formed to connect with, for example, the waveguide of the transmission part 20.

Figure 3:
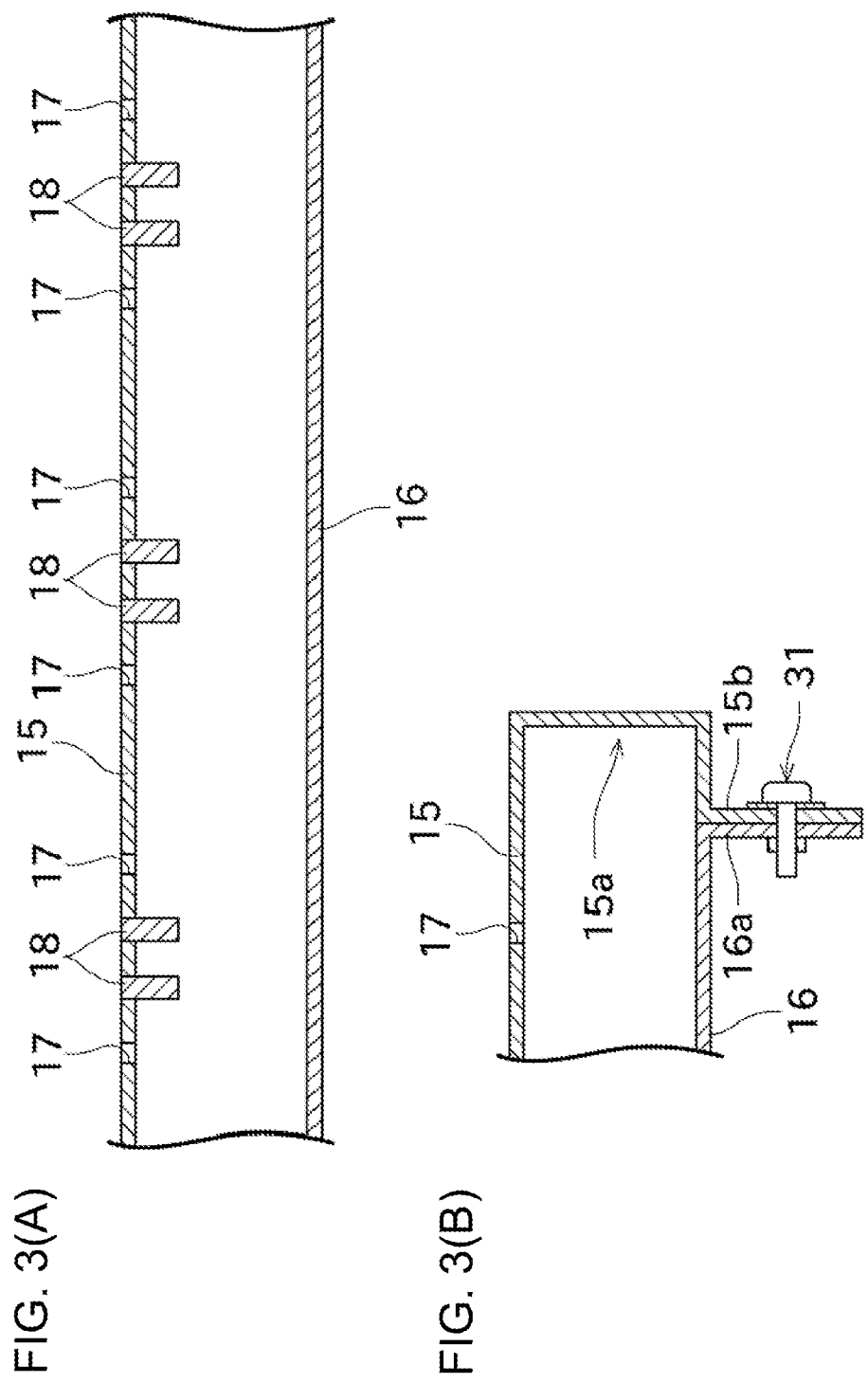
FIGS. 3(A) and 3(B) show cross-sectional views of a center part and an end part of the antenna, respectively.

End parts of the front-face metal plate 15 and the back-face metal plate 16 are attached, at their end portions, by a fixing member 31 as illustrated in the cross-sectional view of FIG. 3(B).

Specifically, the front-face metal plate 15 is bent (stamped) at three positions, and channel-shaped portions (substantially U-shaped portions) 15a and a connecting portion 15b are formed. The channel-shaped portions 15a form a side face of the radiation waveguide part 11. The connecting portion 15b is used to connect the front-face metal plate 15 with the back-face metal plate 16.

Moreover, the back-face metal plate 16 is bent at one position, and a connecting portion 16a is formed. This connecting portion 16a is attached to the connecting portion 15b by the fixing member 31 described above. Moreover, although a part of the side face of the radiation waveguide part 11 is opened even when the front-shape metal plate 15 is attached to the back-face metal plate 16 as described above, the opening part is closed by, for example a metal tape.

As above, in the radiation waveguide part 11, a space surrounded by conductive members can be achieved.

The slots 17 are penetrating holes for radiating outside a radio wave propagated inside the space of the radiation waveguide part 11. Moreover, each slot 17 is a long hole and formed to be arrayed in longitudinal and lateral directions thereof (see FIG. 2). Moreover, an arrangement interval of the slot 17 with another one in its longitudinal direction and an arrangement interval of the slot 17 with another one in its lateral direction are respectively fixed.

The stubs 18 are cylindrical members. Each stub 18 is attached on either one of sides of slot 17 in the lateral direction, for every slot 17. Moreover, whether the stub 18 is formed on the side or the other side in the lateral direction is different (the stubs 18 are alternately disposed) between the slots adjacent to each other in up-and-down directions or left-and-right directions. As illustrated in FIG. 3(A), the stubs 18 are disposed to extend from the front-face metal plate 15 toward the back-face metal plate 16.

With this configuration, the transmission mode of the radio wave in the space of the radiation waveguide part 11 can be changed. Therefore, even when the slots 17 are arrayed symmetrically as described above, the radio waves to be radiated can be prevented from cancelling each other out. Moreover, since the slots 17 are arrayed symmetrically, occurrence of side lobes in the directions illustrated in FIG. 6(B) can be suppressed. Thus, the radio wave suppressed in occurrence of side lobes can be radiated outside from the radiation waveguide part 11.

The radio wave radiated by the radiation waveguide part 11 reflects on rain, cloud and the like. The antenna device 1 receives this reflection wave in a reverse flow inside the path of the radio wave described above. Then, for example, the controller of the radar apparatus analyzes this reflection wave and, thus, the antenna device 1 can obtain position, size, and density of water droplet.

Next, a method of forming the slots 17 and the stubs 18 in the front-face metal plate 15 is described above. FIGS. 4(A)-4(D) show views for describing a part of a flow of manufacturing the antenna 10 (particularly the radiation waveguide part 11).

Figure 4:
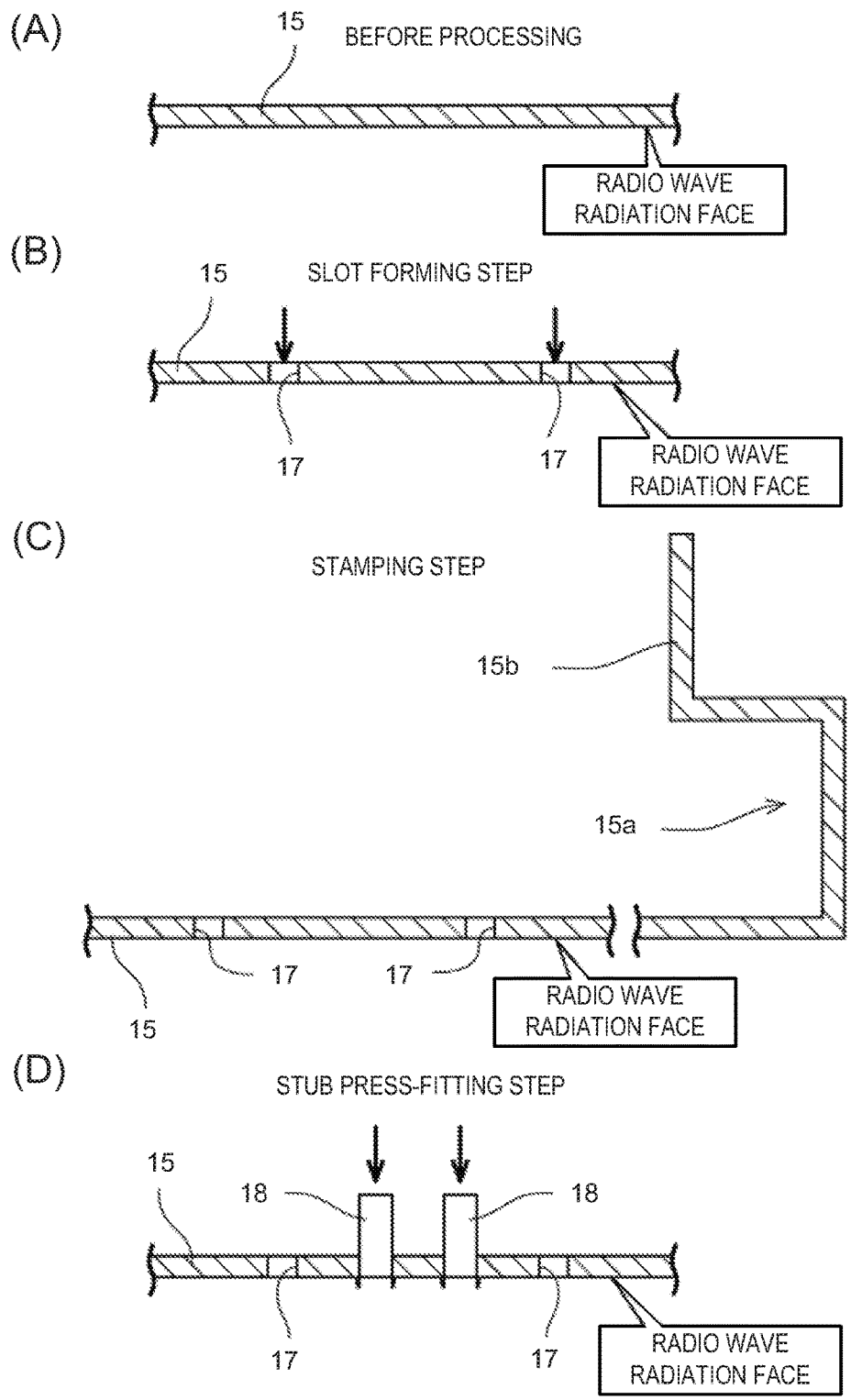
FIGS. 4(A)-4(D) show views for describing a part of a flow of manufacturing the antenna.

First, the front-face metal plate 15 cut into a predetermined shape is prepared (FIG. 4(A)). Then, the slots 17 are formed in the back face of this front-face metal plate 15 by, for example, turret punch press (FIG. 4(B)).

Next, by bending (stamping) the front-face metal plate 15 as described above, the channel-shaped portions 15*a* and the connecting portion 15*b* are formed (FIG. 4(C)).

Next, the stubs 18 are piled (press-fitted; FIG. 4(D)) from the back surface of the front-face metal plate 15 by a press-fitting machine, for example. Moreover, in the press-fitting work, burrs may be created in a face opposite to the worked face. The burrs created in the metal plate can easily be removed; however, if the burrs exist in the space of the radiation waveguide part 11, the radio wave propagating in this space may be slightly distorted. In this regard, in this embodiment, the configuration is adopted, in which the stubs 18 are piled from the back face of the front-face metal plate 15; therefore, the existence of burrs in the space of the radiation waveguide part 11 can surely be prevented.

Then, the front-face metal plate 15 is connected with the back-face metal plate 16 as described above. As described above, the radiation waveguide part 11 can be created. Note that, the manufacturing method given here is an example, and, for example, the order of the flow and the machine utilized in each step of the flow can suitably be changed. For example, the step of forming the slots 17 and the step of press-fitting the stubs 18 can be switched.

Next, another example of the stubs 18 is described. In this embodiment, a configuration in which the stubs 18 prevent the radio waves to be radiated from cancelling each other out is adopted. Here, as for the position, size, and shape and the like of the stubs 18, the example given in the above embodiment is not necessarily optimal, and it is considered that an antenna property and the like are improved by suitably changing them.

For example, the position where the stub 18 is formed (a distance between the slot 17 and the stub 18) may be changed according to, for example, the piled position, instead of the position being fixed. Moreover, the size or the shape of the stub, or whether to pile may be changed. Further, a configuration may be adopted, in which the size or the shape changes according to the piled position. By changing the distance between the slot 17 and the stub 18, the strength of the radio wave to be radiated from the antenna 10 can be changed.

Figure 5A:
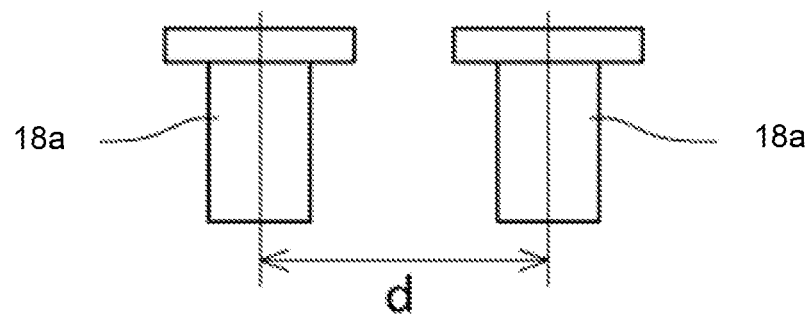
FIGS. 5(A)-5(C) show views illustrating an example of a shape of stubs and combinations thereof.
Figure 5B:
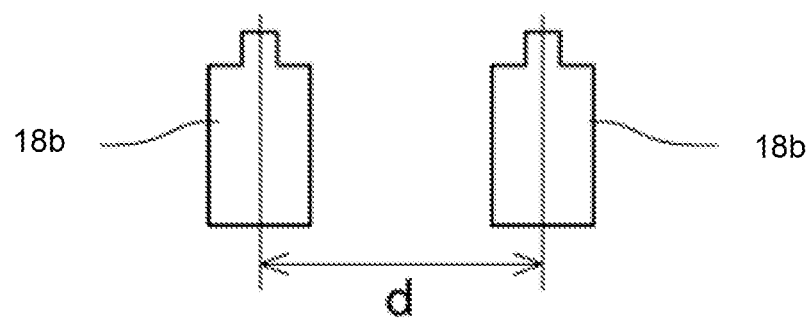
Figure 5C:
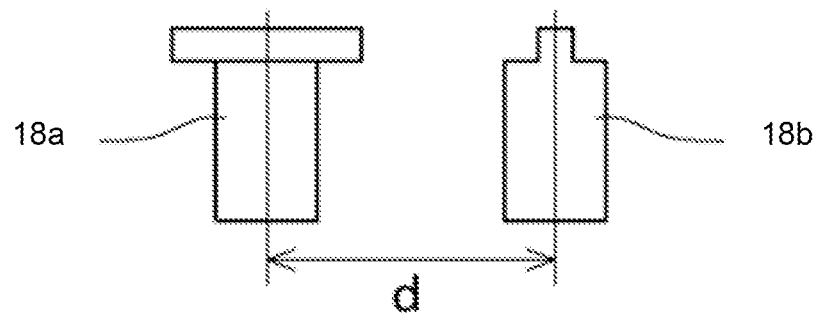

The stub 18 may have, as a stub 18*a* in FIG. 5(A), a shape (T-shape) in which the diameter of a part fixed to the front-face metal plate 15 is larger than other part (the part protruding inward of the radiation waveguide part 11). Moreover, the stub 18 may have, as a stub 18*b* in FIG. 5(B), a shape in which the diameter of a part fixed to the front-face metal plate 15 is smaller than the other part.

As a combination of the stubs 18, they may be disposed such that the stubs 18*a* are adjacent to each other, or the stubs 18*b* are adjacent to each other. Moreover, the stub 18*a* and the stub 18*b* may be disposed adjacent to each other. Note that, when disposing the stubs 18*a* to be adjacent, since the parts having large diameters interfere with each other, a distance d between the stubs is restricted.

Moreover, even when the stub 18 is formed into a planar plate instead of a pillar shape, the effect of this application can be exerted. However, by forming into the pillar shape, whether to pile can be controlled finely, and therefore, satisfactory antenna property can possibly be obtained.

As described above, the antenna 10 includes a radiation waveguide part 11 and the stubs 18. The radiation waveguide part 11 has the two sheets of metal plates opposing to each other, and the radio wave is radiated outside from the plurality of slots 17 formed in one of the metal plates. Each stub 18 is disposed for every slot 17 to extend inward of the radiation waveguide part 11 from the face where the slots 17 are formed, and changes the transmission mode of the radio wave inside the radiation waveguide part 11. The slots 17 are narrow and arranged at fixed intervals in the longitudinal direction and in the lateral direction, respectively. The stub 18 is disposed for every slot 17, on either one of the sides of the slot 17 in the lateral direction. With the adjacent slots 17, the stubs are disposed on the opposite sides in the lateral direction.

Although the preferred embodiment of this disclosure is described above, the above configurations may be modified as follows, for example.

The radiation waveguide part 11 is not limited to have the configuration in which the metal plates are directly coupled to each other, and may be coupled to each other via other member.

The radiation waveguide part 11 may be formed by connecting the front-face metal plate 15 bent a plurality of times and the back-face metal plate 16 that is not bent.

The stub 18 is not limited to have the configuration of being mechanically press-fitted, and may have a configuration of being attached by a person with a thread, for example. Moreover, the shape of the stub 18 is also not limited to the configuration described above and may be any arbitrary shape.

DESCRIPTION OF REFERENCE NUMERAL(S)

1 Antenna Device
10 Antenna
11 Radiation Waveguide Part
15 Front-face Metal Plate
16 Back-face Metal Plate
17 Slot
18 Stub

The invention claimed is:

1. An antenna, comprising:
   a radiation waveguide part including two sheets of metal plates facing each other and configured to outwardly radiate a radio wave from a plurality of slots formed in one of the metal plates; and
   a stub arranged for every slot to extend inward of the radiation waveguide part from a face of the radiation waveguide part where the slots are formed, and configured to change a transmission mode of the radio wave within the radiation waveguide part,
   wherein the slots are narrow and arranged at fixed intervals in a longitudinal direction of the slots and in a lateral direction of the slots, respectively, and
   wherein the stub is disposed for every slot, on either one of sides of the slot in the lateral direction, the adjacent stubs in the lateral direction being disposed on the opposite sides.

2. The antenna of claim 1, wherein the stub has a circular cylindrical shape, and
   wherein the stub is mechanically press-fitted into the radiation waveguide part.

3. The antenna of claim 2, wherein the radiation waveguide part is formed by a front-face metal plate forming at least a front face of the radiation waveguide part and a back-face metal plate forming at least a back face of the radiation waveguide part, and wherein at least one of the front-face metal plate and the back-face metal plate is bent, and by utilizing a bent portion, the front-face metal plate is connected with the back-face metal plate.

4. The antenna of claim 2, wherein an interval between the slot and the stub is different depending on a position of the stub on the radiation waveguide part.

5. The antenna of claim 2, wherein the antenna is used for meteorological observation.

6. The antenna of claim 1, wherein the radiation waveguide part is formed by a front-face metal plate forming at least a front face of the radiation waveguide part and a back-face metal plate forming at least a back face of the radiation waveguide part, and wherein at least one of the front-face metal plate and the back-face metal plate is bent, and by utilizing a bent portion, the front-face metal plate is connected with the back-face metal plate.

7. The antenna of claim 6, wherein an interval between the slot and the stub is different depending on the position of the stub on the radiation waveguide part.

8. The antenna of claim 6, wherein the antenna is used for meteorological observation.

9. The antenna of claim 1, wherein an interval between the slot and the stub is different depending on a position of the stub on the radiation waveguide part.

10. The antenna of claim 9, wherein the antenna is used for meteorological observation.

11. The antenna of claim 1, wherein the antenna is used for meteorological observation.

12. A method of manufacturing an antenna, comprising:

forming a radiation waveguide part to include two sheets of metal plates facing each other and configured to outwardly radiate a radio wave from a plurality of slots formed in one of the metal plates; and forming a stub arranged for every slot to extend inward of the radiation waveguide part from a face of the radiation waveguide part where the slots are formed, and configured to change a transmission mode of the radio wave within the radiation waveguide part, wherein the slots are narrow and arranged at fixed intervals in a longitudinal direction of the slots and in a lateral direction of the slots, respectively, and wherein the stub is disposed for every slot, on either one of sides of the slot in the lateral direction, the adjacent stubs in the lateral direction being disposed on the opposite sides.

* * * * *